United States Patent [19]

Leibundgut

[11] 4,068,944
[45] Jan. 17, 1978

[54] MICROFILM VIEWER HAVING ENLARGED COPY PRODUCTION ATTACHMENT

[75] Inventor: Max Leibundgut, Wadenswil, Switzerland

[73] Assignee: Alos AG, Zurich, Switzerland

[21] Appl. No.: 668,812

[22] Filed: Mar. 19, 1976

[30] Foreign Application Priority Data

Mar. 26, 1975 Switzerland .................. 3874/75

[51] Int. Cl.² .............................................. G03B 13/28
[52] U.S. Cl. ....................................... 355/45; 355/57; 355/60; 355/66
[58] Field of Search ............................ 355/40–45, 355/57, 60, 65, 66, 21

[56] References Cited

U.S. PATENT DOCUMENTS

| | | | |
|---|---|---|---|
| 3,055,266 | 9/1962 | Frantz et al. | 355/45 X |
| 3,240,115 | 3/1966 | Robbins et al. | 355/45 X |
| 3,308,713 | 3/1967 | Miller | 355/45 X |
| 3,323,414 | 6/1967 | Ritchie et al. | 355/43 X |
| 3,619,052 | 11/1971 | Diachuk | 355/45 |
| 3,740,136 | 6/1973 | Maloney et al. | 355/45 X |
| 3,890,045 | 6/1975 | Bernstein et al. | 355/45 X |
| 3,907,415 | 9/1975 | Sone et al. | 355/45 X |

Primary Examiner—Richard A. Wintercorn
Attorney, Agent, or Firm—Watson, Cole, Grindle & Watson

[57] ABSTRACT

A microfilm viewer has an attachment for producing enlarged copies of microfilm, the viewer being of a typical construction and modified as having a cabinet opening beneath the area containing a first mirror used for deflecting a beam of light issuing from a projecting lens onto a projection screen. An undercut area is provided in the cabinet below such opening within which area a separate auxiliary device for making copy enlargements of microfilm records is located. Such auxiliary device has a support frame for a second mirror, the frame and second mirror extending into the opening provided in the viewer cabinet. The second mirror is so disposed as to catch the light beam reflected from the first mirror and deflect it onto a substantially horizontal picture plane of the auxiliary device so as to illuminate a light-sensitive material located in such picture plane.

11 Claims, 4 Drawing Figures

MICROFILM VIEWER HAVING ENLARGED COPY PRODUCTION ATTACHMENT

BACKGROUND OF THE INVENTION

This invention relates generally to a combined microfilm viewer and film copier, and more particularly to such a viewer as having an attachment for the production of enlarged copies of the microfilm.

A typical microfilm viewer includes a light means, a microfilm holding device, a projecting lens, means for deflecting the beam of light issuing from the projecting lens and a projection screen for viewing the transillumination, such elements being arranged in a single cabinet in such a manner that the film holding device may be operated and the projection screen viewed from an unchanged position of the operator. The optical axis common to the light means and to the projection lens is set at an angle of between 10° and 30° above a horizontal plane, and a single surface mirror is disposed at the back wall of the cabinet for deflecting the light beam onto the projection screen.

Known microfilm viewers of the type described and of other designs are constructed in such a manner as to facilitate proper viewing of the microfilm records, but are not capable of producing an enlarged copy thereof onto light-sensitive copy material. On the other hand, there are also microfilm viewing and enlarging machines with which it is possible to alternately view microfilm records and/or to produce copies of enlargements thereof. The known devices of this latter type differ from the viewers discussed above both in their mechanical construction and in their optical system. There are believed to be no known microfilm viewers that are capable of being effectively converted into a combined microfilm viewer and copy enlarging machine simply by the addition of a few elements, either at the place of manufacture or by the user of the viewer. Thus, if one having a microfilm viewer should ever need to make copies of the enlargements of the microfilm records, it would need to be done with the use of some other machine perhaps outside the user's office location, which is not only troublesome but time-consuming, or a completely separate microfilm viewer and enlarging copy device would need to be obtained, which is costly and requires additional space for the copy machine. Because of the different mechanical construction of the microfilm viewer on the one hand and the microfilm viewer and enlarging copy device on the other, completely different cabinets and other parts must be developed and produced for the two machines, which of course increases the cost of manufacture and the storage space.

SUMMARY OF THE INVENTION

It is an object of the present invention to avoid the disadvantages described above by providing a machine for both viewing and producing copy enlargements of microfilm records wherein the machine is converted from a relatively simply-constructed microfilm viewer into a microfilm viewing and copy enlarging machine by simply attaching an auxiliary device.

This objective is achieved according to the invention wherein the cabinet of the typical microfilm viewer described above is modified to have an opening beneath the space containing the surface first mirror and the projection screen, and an undercut in the cabinet below this opening for attaching a separate auxiliary device for making copy enlargements of microfilm records. Such auxiliary device has a support frame for a single surface second mirror, which frame and second mirror extend into the opening in the viewer cabinet. The second mirror casts the light beam reflected from the first mirror onto a substantially horizontal picture plane of the auxiliary device, to illuminate a light-sensitive material located in the picture plane.

Other objects, advantages and novel features of the invention will become more apparent from the hereinafter detailed description of the invention when taken in conjunction with the accompanying drawings.

DETAILED DESCRIPTION OF THE INVENTION

Figure 1:
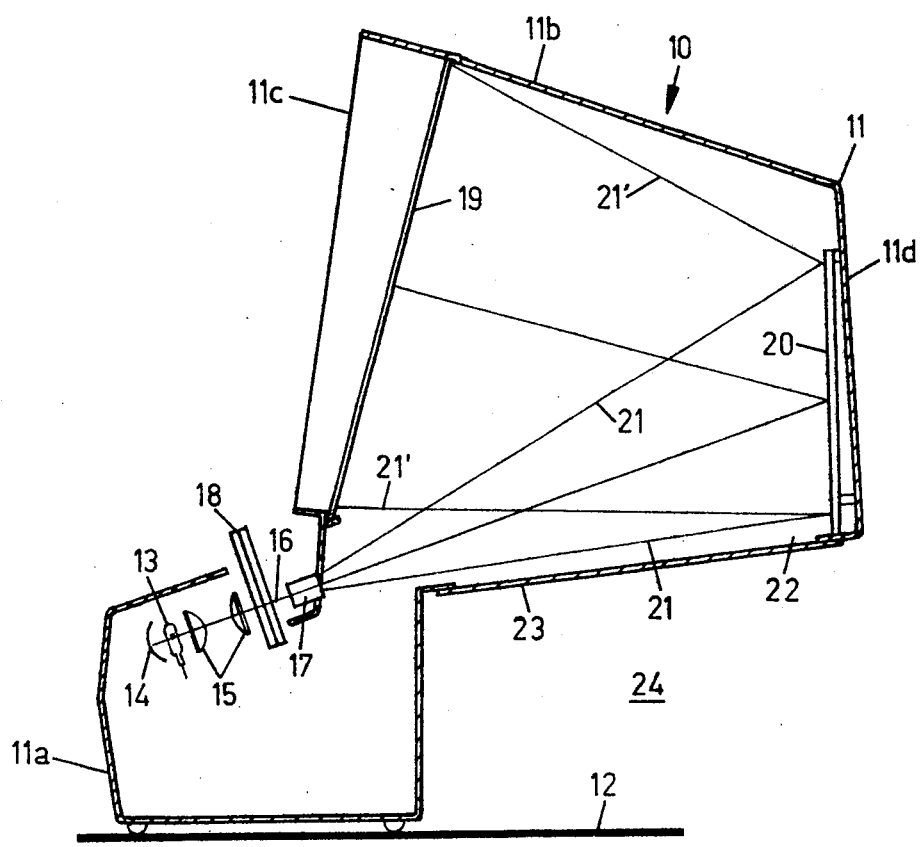
FIG. 1 is a schematic illustration partly in vertical section taken through a microfilm viewer having a holding device for film strips.

Turning now to the drawings wherein like reference characters refer to like and corresponding parts throughout the several views, a microfilm viewer 10 shown in FIG. 1 has a cabinet 11 capable of resting on a table surface 12 or the like. Mounted in a bottom section 11a of cabinet 11 is a light means which includes an electric light bulb source 13, a concave mirror 14 used as a reflector and an optical condenser 15 comprising one or two (or more) lenses. Optical axis 16 of light means 13 to 15 is disposed upwardly from the horizontal by an acute angle between 10° and 30°, preferably about 18°. Mounted on the same axis is a replaceable projecting lens 17.

Located between optical condenser 15 and projecting lens 17 is a holding device 18, accessible from outside the cabinet, for a microfilm strip of the type wound onto a spool. Holding device 18 has two glass plates, between which the filmstrip extends and which are separable from one another for inserting the film strip. An upper section 11b of cabinet 11 has a window opening 11c disposed above projecting lens 17. Inserted into this window opening 11c is a ground-glass plate 19 that serves as the projection screen for viewing the transillumination in the normal manner. Plate 19 is inclined rearwardly in relation to the vertical (toward the right in FIG. 1) by about the same angle as the common optical axis 16 of light means 13 to 15 and projection lens 17. A surface mirror 20 is mounted in an approximately vertical position in the vicinity of a back wall 11d of cabinet upper section 11b. By means of this surface mirror 20, a light beam 21 issuing from projecting lens 17 is deflected toward ground-glass plate 19, so that a projection of the microfilm record is produced for viewing on ground-glass plate 19. The light beam cast against ground-glass plate 19 by surface mirror 20 is designated 21' in FIG. 1.

Beneath the space containing surface mirror 20 and ground-glass plate 19, cabinet upper section 11b has a substantially horizontal space 22 closed by a removable cover 23. Located beneath this cover is an undercut area 24 in the cabinet for attaching a separate auxiliary device (not shown in FIG. 1) for producing copies of enlargements of microfilm records, as will be hereinafter explained.

Figure 2:
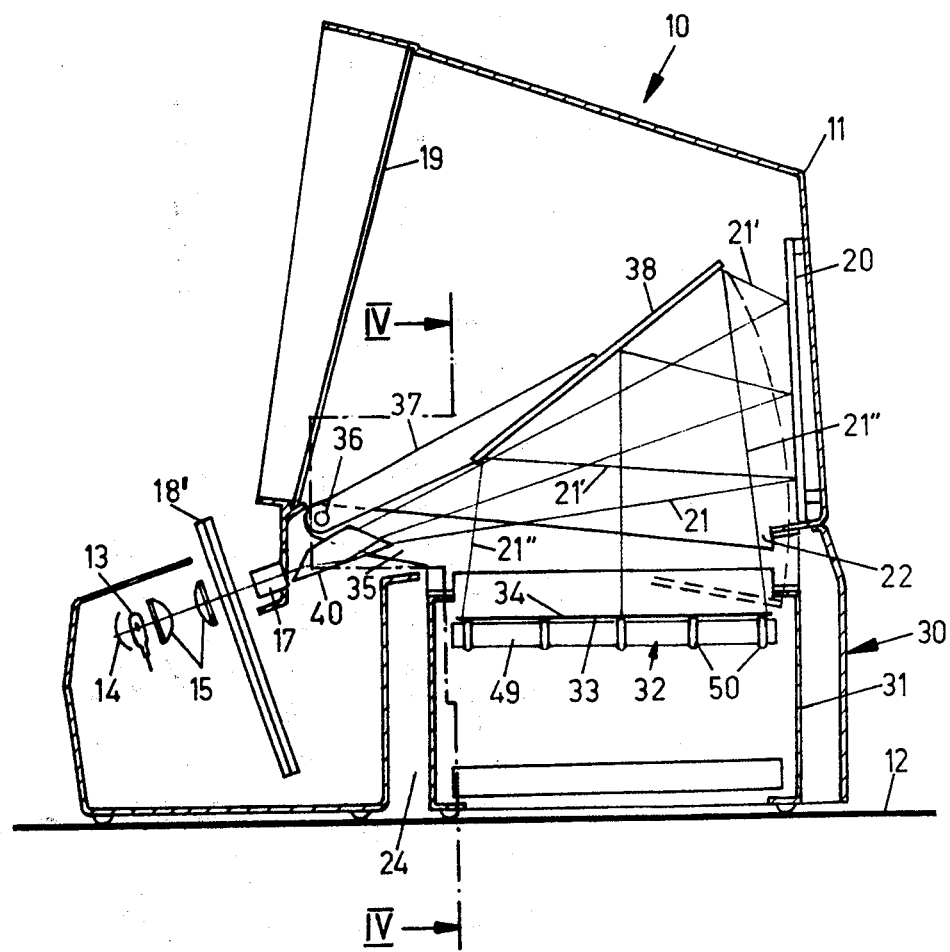
FIG. 2 is a similar sectional view taken through a microfilm viewer and copy enlarging apparatus comprising the viewer of FIG. 1 and an auxiliary device, the viewer having a holding device for microfilm slides.

Shown also in FIG. 2 is microfilm viewer 10 already described, wherein similar parts are designated by the same numerals as in FIG. 1. The only difference for this viewer over that of FIG. 1 is the holding device for microfilm strips, there being a holding device 18' provided for plate-shaped microslides. Also shown in combination with microfilm viewer 10 is a separate auxiliary device 30 capable of effecting the production of copies of enlargements of microfilm records. This auxiliary device 30 is essentially mounted in undercut area 24 of viewer 10, has a cabinet 31 capable of resting on table surface 12 and is open at the top thereof. Cover 23 (FIG. 1) is removed from opening 22 of cabinet 11, so that the interiors of cabinets 11 and 31 intercommunicate. Mounted in the upper section of cabinet 31 is a platform 32 for supporting an enlargement sheet 34 covered with a light-sensitive coating and lying in a horizontal plane 33, hereinafter referred to as a picture plane.

Cabinet 31 of auxiliary device 30 has a pair of arms 35 (FIGS. 2 and 4) that project through opening 22 of cabinet 11. Pivoted to each of the arms 35 by means of a hinge 36 is one end of a swivel arm 37. The other ends of the two swivel arms 37 are rigidly attached to a surface mirror 38 having a reflecting surface facing downwardly. Arms 35 and swivel arms 37 together form a support frame for surface mirror 38. By pivoting arms 37 about the common swivel axis of hinges 36, surface mirror 38 can be moved into either an out-of-use position directly above platform 32 (as shown in FIG. 4 and indicated by dotted lines in FIG. 2) or a working position (as shown in FIG. 2 in solid outline). In its out-of-use position, surface mirror 38 is completely out of range of light beam 21 issuing from projecting lens 17 to surface mirror 20 of viewer 10, which beam is cast within marking lines 42 (FIG. 3) onto ground-glass plate 19. However, when surface mirror 38 is in its working position, it then assumes such a position that it catches a light beam 21' reflected by surface mirror 20 before it reaches ground-glass plate 19 and deflects it downwardly toward platform 32 so that image-rotating instead of appearing on ground-glass plate 19, the microfilm image appears on the light-sensitive layer of enlargement sheet 34 lying on platform 32. The light beam reflected by surface mirror 38 is designated 21" in FIG. 2. It is advisable that the optical distance between picture plane 33 of platform 32 and projecting lens 17 be equal to the optical distance between the ground-glass plate and lens 17. In this way, the image produced on light-sensitive sheet 34 will be the same size as the image produced on ground-glass plate 19.

If desired, an image-rotating prism 40 can be mounted at the light-exit side of projecting lens 17, which prism can be operated from outside cabinet 11 to effect image rotation of a microfilm record appearing on ground-glass plate 19 or in picture plane 33 of platform 32 by as much as 90° for adjustment to the usually rectangular shape of light-sensitive sheet 34. Such an image-rotating prism 40 may also be provided for microfilm viewer 10 according to FIG. 1.

Figure 3:
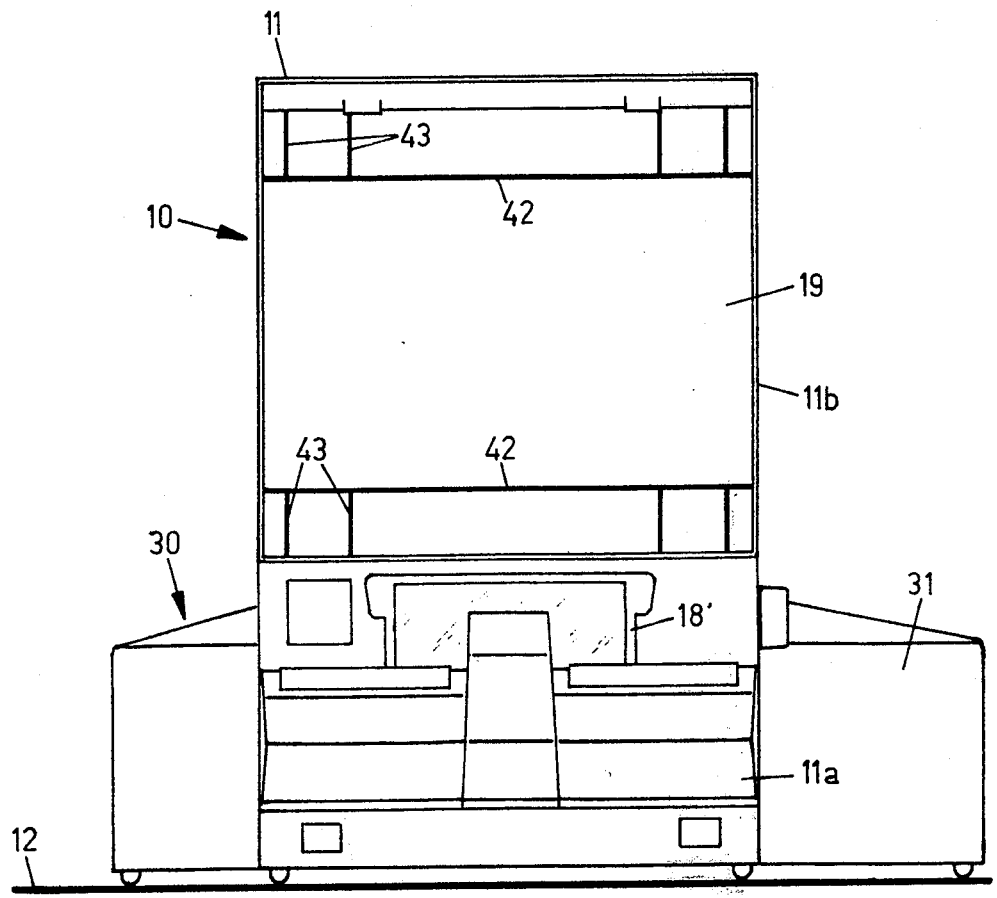
FIG. 3 is a front elevational view of the apparatus according to FIG. 2.
Figure 4:
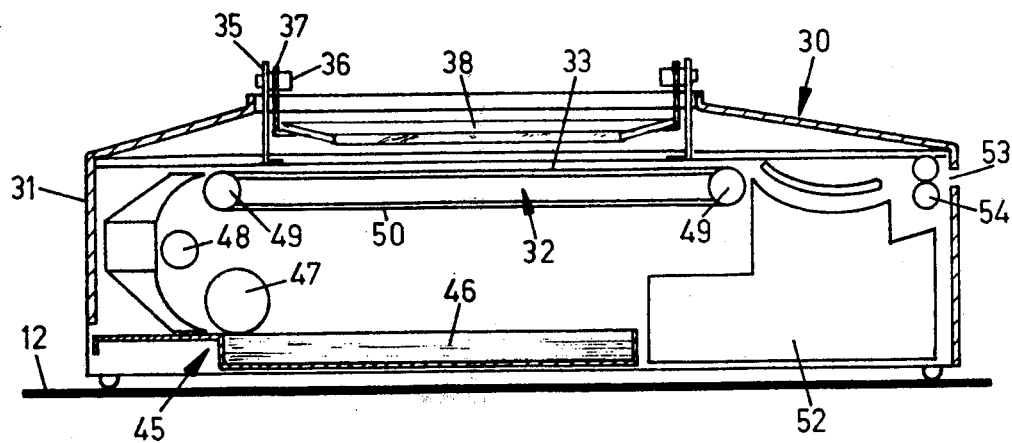
FIG. 4 is a sectional view taken substantially along line IV—IV of FIG. 2 through the auxiliary device only, whereby the surface mirror of this device is shown in an out-of-use position, turned downwardly.

FIG. 3 is a front elevational view of microfilm viewer 10 with auxiliary device 30 seen from the side from which it is operated. Also, FIG. 3 illustrates marking lines 42 and 43 provided on ground-glass plate 19 of viewer 10 to be used as reading aids; the lines 42, together with the vertical edges of the ground-glass plate, indicate the size and relative position of light-sensitive enlargement sheet 34.

As can be seen in the sectional view of FIG. 4, auxiliary device 30 has an automatic sheet-dispensing device 45 located beneath platform 32 and within cabinet 31, which provides for moving a single light-sensitive enlargement sheet 34 from a supply stack 46 to picture plane 33 of platform 32 by means of rollers 47,48. Platform 32 comprises two cylinders 49 and several endless belts 50 extending thereabout. Also, located within cabinet 31 of auxiliary device 30 is an automatic developing device 52. Cabinet 31 also has a slit 53 through which the developed enlargement sheets 34 are ejected by means of a pair of rollers 54. Such sheet-dispensing devices and developing units are well-known, and need not be described in greater detail here.

The operating principle of the above-described machine is, in brief, as follows:

Whenever the need arises to only view microfilm records, without making copies therefrom, viewer 10 according to FIG. 1 may be used. The viewer may be provided with either a holding device 18 for microfilm strips that can be wound onto spools, or with a holding device 18' (FIG. 2) for plate-shaped microfilm slides. If necessary, image-rotating prism 40 (FIG. 2) may also be provided for viewer 10, but this is not absolutely necessary. Using viewer 10, it is possible to project an enlargement of a microfilm record set into holding device 18 or 18' onto ground-glass plate 19, thus making it readable.

If, however, one wishes to have a device that makes it possible to not only view microfilm records, but also to make enlarged copies therefrom, then a viewer 10 combined with the separate auxiliary device 30, as illustrated in FIGS. 2 and 3, may be used. Nothing on viewer 10 need be modified for this purpose; only cover 23 needs to be removed from cabinet opening 22 and — if it is not already provided — image-rotating prism 40 should be added. If additional surface mirror 38 of auxiliary device 30 is pivoted downwardly, as shown in FIG. 4 and indicated by dotted lines in FIG. 2, then this device, like viewer 10, can be used alone for projecting microfilm records onto ground-glass plate 19 for viewing. If an enlarged copy is to be made of a selected microfilm record, then such record is first projected onto ground-glass plate 19 and the image is adjusted so that it falls inside marking lines 42. If necessary, the image can be rotated 90° using image-rotating prism 40, so that it appears in broadside form on ground-glass plate 19. Then, by manipulating an activation button (not shown in the Figures), surface mirror 38 of auxiliary device 30 is brought to its working position, indicated in solid outline in FIG. 2, and sheet-dispensing device 45 is activated to bring a light-sensitive enlargement sheet 34 onto picture plane 33 on the platform, leaving lamp 13 of light means 13 to 15 turned off. Once the sheet is in place, lamp 13 of light means 13 to 15 is turned on, whereupon the previously selected and inserted microfilm record is projected onto light-sensitive enlarging paper 34 and the enlarging paper is illuminated. After the exposure time is finished, lamp 13 (preferably automatic) is again turned off and the exposed enlarging sheet 34 is moved to development device 52.

The developed picture is then ejected through slit 53 out of auxiliary device 30.

Among the advantages of this machine, the following should especially be mentioned:

Viewer 10 can be used as a device for both viewing microfilm records and for producing enlarged copies of the same, without requiring significant alterations. In order to render it possible to produce enlarged copies, it is only necessary to attach separate auxiliary device 30 to viewer 10. This represents considerable savings. The combined machines 10 and 30 essentially require no more space than viewer 10 alone. Since picture plane 33 of auxiliary device 30 is horizontal, the enlargements can be produced without difficulty in an automatic wet developing process. Holding devices for either microfilm strips or microfilm slides can be attached to viewer 10, so that different reading machines are not required for changing from strips to slides or vice-versa. The optical system shown in FIGS. 1 and 2 provides for a sloping position of microfilm holding devices 18 or 18', which incline slightly in the direction of the operator, which makes working with microfilm slides, especially, much less troublesome, as the operator may prop his elbows on table surface 12 as he moves microfilm slide holding device 18' up and down or sideways in the path of rays coming from projecting lens 17, in order to find the desired microfilm record. This makes unfatiguing operation of viewer 10 possible.

Many modifications and variations of the present invention are made possible in the light of the above teachings. It is therefore to be understood that within the scope of the appended claims the invention may be practiced otherwise than as specifically described.

What is claimed is:

1. A table-top microfilm viewer and separate attachment device for producing enlarged copies of the microfilm, said viewer including a cabinet containing a light means, a microfilm holding device, a projection lens, means for deflecting a light beam issuing from said lens, and a projection screen onto which the light beam is deflected for viewing the transillumination; said light means and said projection lens being so disposed that an optical axis common to said light means and to said projection lens lies at an angle of between 10° and 30° to a horizontal plan; said deflecting means comprising a single surface first mirror mounted a predetermined spacing from said screen within said cabinet and lying in a substantially vertical plane for deflecting the light beam onto said projection screen; said cabinet having removable means for forming an opening therein below the area between said screen and said first mirror, and said cabinet being formed so as to provide an undercut portion below said opening and above a tabletop; a separate attachment device for producing enlarged copies of the microfilm removably positionable in said undercut portion, said device comprising a housing, means connected to said housing supporting a single surface second mirror, a horizonally disposed platform means in said housing, means for positioning a light-sensitive material on said platform means, and said support means for said second mirror being pivotable so as to position said second mirror through said opening in said cabinet and into said area between said first mirror and said screen so as to deflect the light beam from said first mirror onto said platform to illuminate said light-sensitive material.

2. The viewer and attachment device according to claim 1, wherein when said second mirror is positioned in said area the optical distance between said lens and said light-sensitive material is equal to the optical distance between said lens and said screen when said second mirror is positioned out of said area, such that the size of the image produced on said light-sensitive material is the same size as the image appearing on said screen upon light beam deflection.

3. The viewer and attachment device according to claim 2, wherein said screen has reading aid markings thereon for centering the image on said screen and with respect of the platform of said device when said support means for said second mirror is pivoted to move said second mirror into said area.

4. The viewer and attachment device according to claim 1, wherein said means for positioning a light-sensitive material on said platform means comprises a sheet dispensing means for said light-sensitive material, said sheet dispensing means including a supply stack disposed below said platform means and rollers for conveying said light-sensitive material from said supply stack to said platform means.

5. The viewer and attachment device according to claim 1, wherein said cabinet further contains an image-rotating prism located at the light-exit side of said lens, said prism being mounted for rotational movement from outside said cabinet.

6. The viewer and attachment device according to claim 1, wherein said microfilm holding device is located below said projection screen and is removable from outside said cabinet, and said holding device being adapted for holding a continuous microfilm strip or for holding microfilm slides.

7. The viewer and attachment device according to claim 4, wherein said attachment device includes means for developing images produced on said light-sensitive material.

8. The viewer and attachment device according to claim 1, wherein said support means for said second mirror comprises at least one arm connected at one end to said housing, at least one swivel arm pivotally connected at one end to the second end of said arm, the second end of said swivel arm supporting second mirror.

9. The viewer and attachment device according to claim 1, wherein said cabinet comprises an upper section and a lower support section positioned diagonally with respect thereto, said upper section having a window opening positioned generally above said bottom section and a back wall, said single surface first mirror being mounted against said back wall, and said screen being mounted within said upper section adjacent said window opening.

10. The viewer and attachment device according to claim 9, wherein said removable means for forming an opening in said cabinet comprises a removable cover positioned against said upper section of said cabinet between a bottom portion of said back wall and said bottom section of said cabinet.

11. The viewer and attachment device of claim 1, wherein said platform means includes a picture plane upon which the light-sensitive material is positionable for illumination.

* * * * *